United States Patent [19]
Baker et al.

[11] 3,903,345
[45] Sept. 2, 1975

[54] SHEET MATERIAL FOR PACKET TECHNOLOGY

[75] Inventors: Mary Joan H. Baker; Robert C. Baker, both of St. Paul, Minn.

[73] Assignee: Robert C. Baker, St. Paul, Minn.

[22] Filed: Oct. 12, 1970

[21] Appl. No.: 80,214

Related U.S. Application Data

[60] Division of Ser. No. 806,983, Mar. 13, 1969, Pat. No. 3,647,305.

[52] U.S. Cl. .............. 428/287; 428/35; 428/90; 428/97; 428/200; 428/349; 428/480; 428/483; 428/913
[51] Int. Cl.² .............. B32B 5/16; B32B 27/12; B32B 27/36; B32B 33/00
[58] Field of Search ......... 161/53, 62, 64, 116, 231, 161/410, 167, 160; 117/122 H; 156/276, 156/279, 226, 227

[56] References Cited
UNITED STATES PATENTS

| | | | |
|---|---|---|---|
| 2,446,414 | 8/1948 | Farrell et al. | 161/160 |
| 2,474,619 | 6/1949 | Farrell et al. | 161/160 |
| 2,688,577 | 9/1954 | Fischer | 161/64 |
| 2,992,149 | 7/1961 | Drelich | 156/276 |
| 3,252,732 | 5/1966 | Squier | 161/64 X |
| 3,257,743 | 6/1966 | Closson et al. | 161/64 X |
| 3,275,487 | 9/1966 | Lemelson | 161/64 X |
| 3,325,332 | 6/1967 | Cleerman | 161/160 |
| 3,411,967 | 11/1968 | Rowland et al. | 161/160 |
| 3,455,720 | 7/1969 | Davies et al. | 161/231 |
| 3,529,986 | 9/1970 | Kappas et al. | 161/64 X |

*Primary Examiner*—George F. Lesmes
*Assistant Examiner*—Charles E. Lipsey
*Attorney, Agent, or Firm*—Robert C. Baker

[57] ABSTRACT

A disposable flexible envelope-like container and a new sheet material are taught. The container is convertible to a pocket applicator for applying packaged messy spreadable compositions such as various polishes, cleaners, pastes, oils, paints, stains, waxes, and many other compositions.

The envelope-like container is easily manufactured by automated techniques. It has opposing walls formed of flexible sheet material. The sheet material preferably employed has a flexible self-supporting organic polymeric film and an exposed recess-containing layer over one surface of that polymeric film. Seals unite peripheral portions of the opposing walls of the envelope together. One edge is only temporarily sealed; and the others are permanently united. Ear-flaps extend beyond the temporary seal.

In use, a person grips the ear-flaps and pulls them apart to rupture the temporary seal and thereby convert the envelope-like container into a pocket. This pocket is then reversed or inverted to place the spreadable composition exterior to the inverted pocket. One then inserts one's fingers in the inverted pocket, which now becomes an applicator, and then applies the spreadable composition. The ear-flaps serve as a shield against unwanted contact with the spreadable composition during application of it to a surface. The length of the temporary seal and its relationship to the depth of the envelope cavity is critical to permit convenient reversal or inversion of the pocket during the step of converting the container into an applicator.

1 Claim, 12 Drawing Figures

PATENTED SEP 2 1975 3,903,345

SHEET MATERIAL FOR PACKET TECHNOLOGY

This invention relates to a new sheet material, a new package structure in the form of a discardable flexible envelope-like container convertible to a pocket applicator, and methods for making the new package structure as well as methods for using it.

The invention provides easily-used discardable applicator packages for messy spreadable compositions such as shoe polishes, metal polishes, or other polishes, various cleaners, cleansers, cosmetic preparations, germicidal mixtures, medicinal compounds, toiletry items, polish removers, pastes, creams, lotions, oils, paints, waxes etc.

Convenience-type packaging of various ingredients in small single-use or discardable applicator packets has been proposed heretofore. An illustrative teaching is set forth in van Boytham U.S. Pat. No. 2,621,784. Van Boytham's structure is that of a sealed envelope which is fully opened and flattened in the palm of one's hand to expose an interior special flannelette applicator pad occupying the central portion of the open envelope layer and suitably cemented to it. A special finger-receiving pocket is created on the under side of van Boytham's open envelope by an extra fold of material. A further illustrative approach is that in Wanzenberg U.S. Pat. No. 3,280,420, where a multi-folded packet is set forth having special areas and limited treated surfaces for the application of shoe polish and the polishing thereof.

One objection to prior art single-use applicator packages or packets is the complexity and therefore the expense of manufacturing them. Another objection is that their arrangement of elements militates against careful and neat application of their contents. For example, the van Boytham flannelette applicator pad occupies most of the open area of his envelope layer, and extends into the palm area of one's hand, which tends to increase the risk of spreading ingredients from the treated pad to undesired areas. Controlled and neat application of ingredients is normally only accomplished with the tips of one's fingers. The Wanzenberg package structure is so complex as to invite almost a professional approach to shoe shining instead of a simple quick and neat job. Still further, known applicator package structures of the prior art are less than effective to save one from messy contact with the packaged ingredients during application of those ingredients to a surface. These and other disadvantages have militated against practical adoption of prior art applicator packets for messy compositions. In short, despite the long standing need for effective single-use applicator packets, and the desire for them by consumers, a truely practical and economical and simple convenience-type single-use package-applicator for messy ingredients, effective to save one from messy contact with those ingredients, has not heretofore, insofar as is known, been available.

This invention provides a novel solution to this problem. The applicator packet of the invention is economical to manufacture, uncomplicated in structure, easy and fast to use in a neat manner, and fully effective to permit application of packaged ingredients neatly upon a surface without contaminating or staining one's fingers or hands. Still further benefits of the invention will be evident as this description proceeds.

This new applicator package is preferably formed using especially prepared flexible sheet material of the invention. This preferred sheet material has a flexible self-supporting organic polymeric film, and an exposed recess-containing layer over one surface of the polymeric film. Preferably, the side of the sheet material having that recess-containing layer (that is, recess-containing structure) is hermetically heat sealable to itself over all portions thereof. Thus, not only is the recess-containing layer side capable of serving as an applicator for polishing or coating a surface with messy material, it is also capable, in the preferred embodiment, of being sealed hermetically to itself by heat. Even when not hermetically heat sealable to itself, seals of permanent as well as temporary character are possible between face-to-face oriented areas of the recess-containing side of a sheet material in an envelope structure of the invention, as will be explained.

The new disposable flexible envelope-like applicator and container is extraordinarly simple to make. Continuous automated manufacturing techniques are possible. Multitudinous folding is avoided, which reduces raw material and manufacturing expenses. Yet the resulting new package structure is fully effective as a container for the marketing of single-use quantities of messy ingredients and is easily converted into an applicator pocket which permits controlled application of those ingredients to other surfaces without need for messy finger contact with the ingredients.

This new package structure is in the nature of an envelope having opposing walls formed of a flexible sheet material. A spreadable messy composition is enclosed within the envelope cavity between the opposing walls of the container. Recess-containing layer means is fixed within the envelope cavity (e.g., the recess-containing layer side of the flexible sheet material) and provides a carrier structure or surface for the messy composition in the envelope cavity.

The sheet material forming the opposing walls is united along all portions thereof immediately adjacent the peripheral limits of the envelope cavity, with all of the portions which are in face-to-face relationship adjacent those peripheral limits being united by seal structures. The expanse of the sheet material forming each of the opposing walls of the container is sufficient in size to extend beyond the seal structure along one edge or peripheral limit of the cavity to form outwardly projecting ear-flaps. The seal structure along that one edge is temporary and rupturable, whereas the other seal structures adjacent the peripheral limits of the envelope cavity are permanent in nature. The edge seal which is temporary is at least 5 centimeters and no greater than about 15 (or possibly but rarely 20) centimeters in total length; and the depth dimension of the envelope cavity downwardly from that temporary seal edge is no greater than about 10 centimeters, and in any event, is less than the length of the temporary seal.

In use, the ear-flaps are gripped by a thumb and forefinger and drawn apart to rupture the temporary seal of that one edge and simultaneously form the container into a pocket. The pocket is then turned inside out to place the recess-containing layer means holding or carrying the spreadable composition on or in it exterior to the inverted pocket. Then a person inserts his fingers into the inverted pocket, where they are protected against contamination during hand application of the composition. The ear-flaps serve as a shield against unwanted contact between the composition and the person applying the composition even when an ear-flap is gripped between one's thumb and palm of hand to guide movement of the pocket applicator over a surface.

The invention will further be described by reference to a drawing, made a part thereof, wherein the several figures are each schematic shetches or illustrations as follows.

Figure 1:
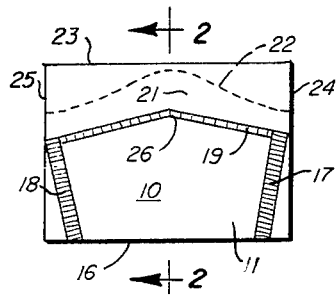
FIG. 1 is a side view of a package structure according to the invention.
Figure 2:
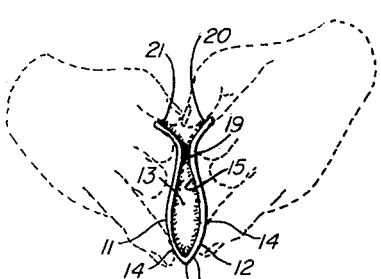
FIG. 2 is a cross-section taken on line 2—2 of FIG. 1, with a person's fingers shown in phantom.

Referring to the drawing, and particularly FIGS. 1 and 2, the new package structure is in the form of an envelopelike container 10 having opposing walls 11 and 12 of flexible sheet material. A small quantity of a spreadable composition 13 is within the envelope cavity of the container. This envelope cavity is between the opposing walls 11 and 12 of the flexible sheet material and is defined by those walls.

Figure 7:
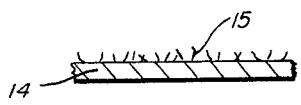
FIG. 7 and 8 are cross-sectional views of illustrative flexible sheet material of the invention.

Referring to FIGS. 2 and 7, an illustrative preferred unitary sheet material useful in the practice of the invention is one having a flexible self-supporting, preferably non-fibrous, non-absorbent, substantially non-porous organic polymeric film 14 (such as "Mylar"), and an exposed recess-containing layer 15 (preferably a layer of random fibrous elements such as polyethylene fibers) scattered over and united to essentially all portions of one surface of the polymeric film, so that the recess-containing layer is essentially coextensive with the base. The recess-containing layer side 15 forms the interior surface of walls 11 and 12 of the package. That recess-containing side is preferably somewhat absorbent in character; and unless otherwise indicated by the context, "absorbent", as used herein in connection with the recess-containing layer includes either or both absorbent and adsorbent phenomenon. (The term "non-absorbent", which is sometimes used in connection with the polymeric base film, is not, hoswever, to be construed as excluding the possibility of a surface of that film exhibiting some surface absorbent phenomenon). The character of the recess-containing layer serves to hold the messy composition more or less in position or partially within limited recesses or openings between elements (such as fibers) forming the structure of that layer. "Recess-containing" refers to recess openings such as irregular spaces of minute or small character between fibrous elements of a layer (e.g., deposited as a layer by flocking), or to a uniform pattern of embossed indents or recesses in a base film, or even to openings or passages in relatively thin sponge-like or porous sheet material. In effect the recess means of the structure comprises a plurality of mini-recesses.

Sheet material of opposing walls 11 and 12 is united (preferably hermetically, but not necessarily so where non-fluid constituents are packaged) along all portions thereof immediately adjacent the peripheral limits of the envelope cavity itself. Illustratively, the bottom edge 16 simply consists of a fold of the sheet material; and this fold permanently unites opposing walls 11 and 12 along that bottom or peripheral lower edge 16. Portions of the recess-containing layer side of the sheet immediately adjacent the lateral peripheral limits of the envelope cavity are united together by permanent seal structures; and this is illustrated by permanent seals 17 and 18 at each lateral extremity or end of the cavity. Temporary seal 19 extends across the top of the cavity uniting the face-to-face oriented sides of each wall at the upper peripheral limits of the cavity.

Figure 5:
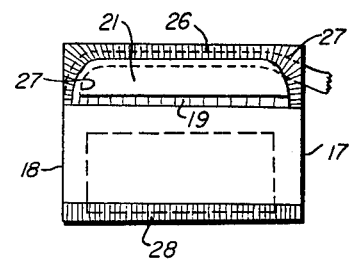
FIGS. 5 and 6 are side plan views of alternate package structures according to the invention.

To be especially observed is that the expanse of the sheet material forming each opposing wall 11 and 12 of the envelope cavity is sufficient in size to extend outwardly beyond the temporary seal structure 19 which is along the upper peripheral edge or one edge of the envelope cavity. The extension beyond temporary seal 19 is in the form of outwardly or upwardly projecting ear-flaps 20 and 21; and this extension must be at least a half centimeter beyond the temporary seal 19. The extension normally should be at least about one centimeter beyond seal 19, or even at least 1.5 centimeters (up to possible 3 or 5 or even 8 centimeters beyond seal 19). The greater extensions provide a surface which sometimes may be useful for finish shining after application of messy ingredients. If desired, the ear-flaps may be of unequal size so as to facilitate separation for hand gripping. They may be shaped in the form illustrated by the dash line 22 in FIG. 1. Preferably, however, ear-flaps 20 and 21 extend outwardly at least about one centimeter along the entire length of temporary seal 19 and suitably terminate more or less in a straight edge 23, even though seal 19 may be arced or elevated at its central portion. Further, the ear-flaps preferably are not united along lateral edges 24 and 25. Thus, the permanent seals 17 and 18 defining the lateral peripheral limits of the envelope cavity usually will not extend out or upwardly any great amount beyond their juncture with the temporary seal 19 (with the possible exception that, when an auxiliary seal structure 26 as illustrated in FIG. 5 is used, the permanent seals 17 and 18 as illustrated in FIG. 1 suitably merge with such an auxiliary seal).

The temporary seal along the one edge 19 of the envelope cavity is relatively easily rupturable by pulling apart ear-flaps 20 and 21. Seal 19 is at least about 5 centimeters and no greater than about 15 (or rarely 20) centimeters in total length. Usually it is at least about 7 centimeters long but not longer than about 10 or 12 centimerers. It is always at least about as long as the longest dimension of the envelope cavity (e.g., between end seals 17 and 18).

The depth dimension of the envelope cavity itself, measured downwardly from the temporary seal 19, is never greater than the length of the temporary seal 19 and generally not in excess of about 10 centimeters.

Envelope cavities of greater depth have been usually found impractical for convenient reversal. Usually, the depth dimension (taken at the greatest distance between seal 19 and the bottom edge 16 of the cavity) is not in excess of about 8 centimeters, with a depth dimension between about 2 and 4 (or sometime as high as 6) centimeters being most preferred. The limited depth (preferably no greater than two-thirds or even one-half the length of the temporary seal) for the cavity serves not only to contribute to ease of reversal, in the manner hereinafter described, but also contributes to concentration of the messy spreadable composition to finger tip areas for application purposes, as will be evident from the teaching to follow.

Figure 3:
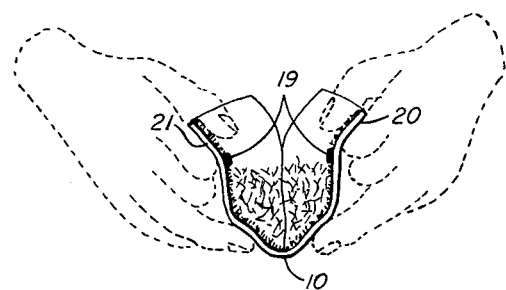
FIG. 3 is a further cross-sectional view along the same plane as FIG. 2, including a person's fingers in phantom, showing the character of the package structure after it has been converted into a pocket.
Figure 4:
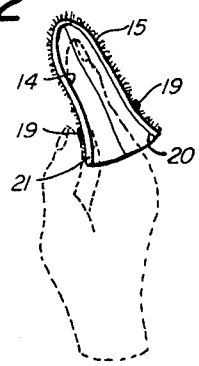
FIG. 4 is likewise a cross-sectional view along the same plane as FIG. 2, including a person's fingers in phantom, showing the character of the package structure after it has been turned inside out and thereby converted into a pocket applicator.

In use, an individual desiring to apply a spreadable composition within the cavity of the package structure first grips each ear-flap 20 and 21 between a thumb and forefinger and pulls those ear-flaps 20 and 21 apart, thereby rupturing the long temporary seal 19 along the top of the envelope cavity. The fingers shown in phantom in FIG. 2 illustrate how this is done. The result is that seal 19 is opened to convert the package structure into a pocket, which is illustrated in FIG. 3. Then the resulting pocket is inverted or turned inside out. This can be done in almost a continuous motion from the rupturing of the temporary seal 19. It is accomplished by continued gripping of the ear-flaps 20 and 21 between thumb and forefinger and holding them apart while simultaneously using the other fingers of one or both hands to press the walls 11 and 12 and the bottom edge 16 of the open pocket upwardly to turn the pocket of FIG. 3 inside out. After being turned inside out, the structure is converted to an applicator which has the appearance, in cross-section, as illustrated in FIG. 4. One then inserts two or three or all fingers of one hand (depending upon the size selected for the package structure) in the inverted pocket applicator and grips an ear-flap by pressing one's thumb against it and against the palm of one's hand. This is shown in phantom in FIG. 4. Thus the inverted pocket, which now has become an applicator, may be firmly gripped during the step of using one's protected fingers to apply the spreadable composition to a surface. The limited depth of the envelope cavity of the package structure as marketed in commerce serves to concentrate the messy ingredients on the exterior of the pocket applicator to an area where finger tip application of them is conveniently accomplished. The earflaps of the inverted pocket further serve as a shield against unwanted contact between the spreadable messy composition and the person applying that composition. This is so even when an ear-flap is gripped, as just noted, between thumb and palm of hand to guide movement of the pocket applicator over a surface.

To be noted is the fact that seals 17 and 18 at the lateral terminal ends of the elongated envelope cavity are preferably such as to taper inwardly (or toward each other) from their widest point at their juncture with the ends of temporary seal edge 19 to the bottom edge 16 of the envelope cavity. Alternately these end seals 17 and 18 may be essentially straight in character; but tapering, as just noted, greatly facilitates convenient reversal of the package in the manner illustrated in FIGS. 2–4 inclusive. Also, the inverted pocket is less apt to have non-reversed small corner sections between the bottom edge 16 and end seals 17 or 18. While such small sections can be inverted by spreading one's fingers into those areas after inverting or reversing the main body of the pocket, the taper or slope of seals 17 and 18 contributes to the ease of inverting and reduces the liklihood that a small portion of the messy ingredients will be unavailable for application because of a non-reversed corner section. Much greater tapering than that illustrated may sometimes be desirable.

A further and most significant feature of the structure illustrated in FIG. 1 is in the design or shape of the temporary seal 19. That temporary seal 19 (both in FIG. 1 and in FIG. 6) is arced or tapered upwardly (i.e., outwardly from the envelope cavity), suitably in curved or straight lines, to a peak or elevation 26, suitably centrally located. This limited section or peak provides a starting point for convenient rupture of seal 19.

FIG. 5 illustrates a package formed using a cylinder of polymeric film, which results in lateral ends numbered 17 and 18 of the envelope cavity being inherently united (e.g., folds). Temporary seal 19 is shown as a straight seal, which is less preferred, but is extremely simple and economical. Illustratively, outer portions or peripheral extremities of the ear-flaps (only flap 21 being visible for the view of FIG. 5) may be continuously united by a contoured strong heat seal 26; but when this is done, some separation means, such as a tear-strip 27 with a projecting part as a grip-tab, should be located between the united ear-flaps. Tear-strip 27 preferably extends partially into the area of seal 26 (which assists in holding tear-strip 27 in position). An extra or auxiliary seal such as seal 26 provides a further fully-sealed chamber beyond temporary seal 19 to protect against loss of cavity contents in the event of accidental rupture of temporary seal 19 during shipment. Tear-strip 27 permits convenient separation of the ear-flaps; and where the temporary seal 19 is not damaged, the flaps are clean to serve the opening and protective functions as aforediscussed. The bottom edge of the envelope cavity in FIG. 5 is united by a permanent heat seal 28, which in this figure also serves to bond and permanently hold one edge of a separate recess-containing layer means as a free tongue in the cavity (said tongue suitably being a sheet of fibers or sponge-like material having the approximate shape within the envelope cavity of FIG. 5 as shown by the dash lines upwardly from seal 28 in FIG. 5).

Figure 6:
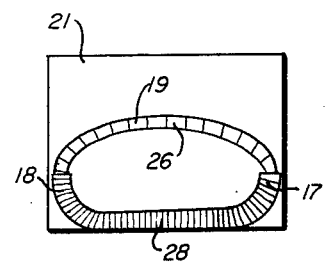

FIG. 6 illustrates an envelope cavity of essentially elliptical shape, formed by providing contoured permanent seals 17 and 18 for approximately the lower half of each end of the ellipse and a continuous stretch of permanent seal 28 along the bottom, with an arced temporary seal 19 across the top of the ellipse and partially into the end curved portions thereof to meet the permanent end seals.

Sheet material useful to form packet structures of the invention must have a self-supporting base layer or film 14 of flexible organic polymeric character. The base polymeric film is preferably very thin (e.g., preferably not over about 80–100 microns thick). Where it is extremely flexible, thicker films (200 or 300 or even possibly as thick as 500 microns) may be used without interferring with pocket inversion. The film structure is strong and tear-resistant in use; and therefore it is tough. It may be as thin as about 5 microns, but usually will lie within the range of thickness of about 10 microns up to about 40 or 60 microns. (An illustrative base polymeric film structure is quarter mil or about 6 micron Mylar coated with a 10 micron heat seal polymeric resin layer or film). The film is not fibrous matt in character, although it may contain embedded fibrous or filament reinforcing. It does not serve per se as an absorbent material; and thus is non-absorbent. It should not react with packaged ingredients. It is substantially non-porous or substantially-fluid-impervious in the sense that, in the packet form, it will substantially prevent migration or leakage of the particular composition packaged. Appropriate fluid-imperviousness to a particular fluid-containing composition to be packaged may be imparted or enhanced, as by employing more than one type of material (either as a laminate or in admixture) in the structure of the base polymeric film. In essence, the base film serves as a substantially impervious barrier to escape of the particular composition which is packaged.

The flexible base film structure may be essentially clear and transparent or tinted or dyed and transparent. It may be pigmented to obscure packaged contents. Inorganic coloring pigments may be concentrated in a single strata of the base structure. A film of vapor deposited metal (e.g., aluminum) may be placed on the base polymeric film, or embedded between layers. Metal foils, however, are too stiff. An embedded vapor deposited metal film (which has the appearance of being substantially continuous) may serve as a good background for printed instructions on sheet material.

Figure 8:
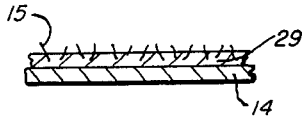

A desirable base film structure is one having a substantially non-thermoplastic essentially non-heat sealable polymeric film (such as, for example, a polyethylene terephalate type film) to which a thermoplastic and readily heat sealable polymeric film or coating (such as, for example, a polyethylene or polyvinylidene chloride) is permanently adhered by any known suitable technique (e.g., primers, chemical reaction, etc.). The films of "Scothpak", which is a trademark of Minnesota Mining and Manufacturing Company, are of such composite unitary character. FIG. 8 illustrates a polymeric film 14 (e.g., 15–20 microns thick) which is not heat sealable or only difficultly heat sealable, but which is coated with a thin film 29 (e.g., 5–10 microns thick) which is readily heat sealable. (Where desired, the heat sealable resin layer in such a structure may be relatively thicker, such as 60 or 80 microns; or additional layers of heat sealable resin may be added, e.g., a coating of acrylic resin solids such as "WN-80" of Rohm & Haas Chemical Company.) Plasticizer's may be incorporated in a heat sealable layer. They generally serve to lower the temperature at which heat sealing may be effected. However, the selection of plasticizer's, which is a well-known art, will be effected to avoid those which migrate and contaminate packaged ingredients. Usually, the thickness of a heat sealable resin coating will not exceed about 30 microns; and the preferred total thickness of the base film as a structure including any resin film coating will not be over about 60 microns. Base structures as thin as possible form the more easily handled packages.

The base polymeric film may itself be formed wholly of heat sealable material. Useful to this end are thermoplastic materials or compositions based upon polymeric resins such as polyethylene, polyvinyl chloride, polyamide-type resins (such as formed by reacting a polybasic acid with a polyamine; "nylon"), nylon reinforced vinyls, and a variety of others.

Upon one side of the base film 14 (or a composite base film such as illustrated in FIG. 8) is preferably united a recess-containing layer 15, which preferably is soft but need not necessarily be napped or "piled". It may be porous or foam resin material of spongy character, with or without fibrous elements (e.g., U.S. Pat. No. 2,671,743), or it may be formed as an irregular layer of non-thermoplastic or thermoplastic fibrous elements, or both. The overall thickness of the layer structure characterized as the recess-containing layer as united to the base desirably is maintained as thin as possible (e.g., up to 50 microns) and is preferably not greater than about 200 or possibly 300 microns. It may be and usually is irregular in thickness. It may be even as thin as only a few microns (especially when formed by flocking fibrous elements or embossing recesses in a base polymeric film). Thiicker recess-containing layers united to a base film, e.g., 500 microns or even 1000 microns (a millimeter) are sometimes useful; but such thicker layers (preferably formed of shiftable fibers on a back film to facilitate pocket inversion) generally are unnecessary and add expense.

Figure 9:
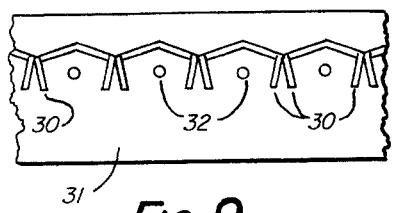
FIG. 9 is a top plan view illustrating a coating pattern for a method of manufacture.

The material of the recess-containing layer, and the character of the base film itself, determines or may limit the useful type of seal structures. But where the base film itself or a coating on it is thermoplastic and heat sealable, and where that heat sealable film is of sufficient thickness (e.g., about 60 microns), non-thermoplastic fibrous elements (such as cellulosic fibers, e.g., paper, rayon or like fibers; or even glass fibers where mild abrasive type action is needed or is not a disadvantage) may be employed in limited quantities while retaining heat sealability for the structure. Flocking of non-thermoplastic fibrous elements on a softened thermoplastic layer is a suitable technique to bond fibrous elements in place; and heat sealing of the fibrous side of the structure to itself may still be accomplished where the thickness of the heat sealable coating is sufficient to swallow-up or penetrate through the fibrous elements during the step of applying modest pressure and the necessary softening heat during heat sealing (e.g., varying normally from about 40° C. up to about 150° C. or 200° C, or even possibly 300° C., depending upon the softening temperature of the heat sealable material employed).

Where a preponderance (e.g., over 50 percent by volume) of the fibrous elements employed are non-thermoplastic— even though they may be bonded to the base film by thermoplastic material—it is suitable to employ very thin base materials and to form seals by adding adhesive material between the portions of the sheet material to be sealed. This may be accomplished in mass production as illustrated in FIG. 9. Adhesive material 30 (preferably heat activatable or thermoplastic) is solvent coated on the fibrous side of the sheet material 31 in a repetitive pattern while the sheet material is in flattened stock form prior to the step of forming any seals. Volatiles are removed from the coated pattern (which will be noted from FIG. 9 to be in the shape of the seals 17, 18 and 19 illustrated in FIG. 1).

Also illustrated in FIG. 9 are droplets or pellets 32 of the ingredients to be packaged. To reduce mess during manufacturing steps, it is suitable to cool or even "freeze" liquid-type spreadable compositions in, for example, rod form. Small pellets may be cut from the rod and automatically positioned as illustrated in FIG. 9; or small quantities of a cooled mass may be dispensed by extrusion as a relatively non-flowable droplet 32 into the proper locations for packaging, as illustrated in FIG. 9. Another suitable technique is that of temporarily encapsulating measured quantities of the ingredients to be packaged. Still another, where only minute quantities are required, is that of a rotogravure or even a lithographic transfer approach.

After volatiles are removed from the coated pattern 30 and the pellets or droplets 32 in position, the lower half of the sheet stock 31 is folded over the upper half and the folded structure is passed between a lower pressure drum and an upper drum having a projecting peripheral pattern of heat elements which mates with the coating pattern 30 as the folded sheet stock is passed through.

In connection with FIG. 9, a further suitable approach is that of coating upon a flat stock formed with heat sealable fibers a relatively wide strip (e.g., the entire edge portion of the flattened stock), from about one centimeter up to about one-fourth the width of the stock, with a relatively non-heat sealable resin (or one softened only above the temperature at which the heat sealable fibers are softened). This contributes to the formation of excellent temporary heat seals which are neatly separable, as will be discussed in connection with FIG. 12.

Alternately, the quantity of adhesive in the pattern for seal 19 (as illustrated in FIG. 9) may be reduced in comparison to the quantity or width of coating for the areas to form permanent seals 17 and 18. Further, a different type of adhesive (e.g., one of relatively low molecular weight, lower softening temperature and low internal strength) may be coated in the pattern for the temporary seal 19. Even possible is the use of room-temperature pressure sensitive adhesive for temporary seal 19; but seals of such material generally are not as reliable as heat seals in terms of handling the packet in commerce. They may be used, however, where the packaged composition does not contain ingredients capable of attaching or separating the seal prematurely. Also possible is the insertion of a strip in the nature of a tear-strip for use to aid separation of a temporary seal.

Preferably, thermoplastic fibrous elements 15 are employed in the fabrication of a recess-containing layer on base polymeric films. Fibers of thermoplastic cellulose acetate, polyvinyl acetate, polyethylene or other thermoplastic material may be flocked upon a base polymeric film and bonded thereto either by partial melting or softening of flocked thermoplastic fibers to gain a bond to base film of non-thermoplastic character, (preferably suitably primed), or by heat-softening a thin thermoplastic base film or coating. While not always necessary, the thermoplastic fibers employed should preferably soften at a temperature no higher than about that for the softening of the thermoplastic resin coating. This relationship is important where the fibers are per se heat sealed (e.g., fused) in the formation of seals for a packet. An interesting sheet structure is that carefully formed by lightly calendering a mat of polyethylene fibers at room temperature and then passing the compacted layer over a heated drum at a temperature sufficient to flow the contacting surface of the mat into a continuous film while at the same time causing the opposite surface of the matted fibers to relax or even expand somewhat outwardly from their compacted calendered condition.

Soft fibrous layers of heat sealable character may suitably be prepared by the Rando-Web technique, or by carding fibers into a porous mat (preferably of overall thickness not above 100 microns). A soft fibrous layer of randomly oriented thermoplastic cellulose acetate fibers (e.g., fibers of about 3 denier size and ½ to 2 inches in length) may be laminated to a base film (e.g., a cellulose acetate film united to a polyethylene terephthalate base) by passing the base film over a heated drum while feeding the layer of fibers to it, preferably under slight bonding pressures. To reduce costs, a small quantity of non-thermoplastic fibers (up to or approaching about 30 percent or so of the total fiber volume) may be incorporated in a thermoplastic fibrous layer without obstructing the heat seal properties of such a thermoplastic fibrous layer; and in that sense, the layer still is characterizable as consisting essentially of thermoplastic fibers or fibrous elements.

The most economical and practical sheet structures of the invention are those wherein the recess-containing fibrous layer, instead of being woven, is simply a randomly oriented layer of non-woven fibers or fibrous elements. Sheet material formed using thermoplastic heat sealable fibers (e.g., thermoplastic at a temperature between about 40° C. and about 300° C.) and preferably a thermoplastic heat sealable polymeric film (or coating on the fiber carrying side of a non-thermoplastic base film) is especially adapted for movement through automatic heat sealing and package forming apparatus.

Figure 10:
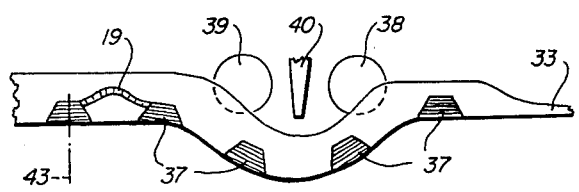
FIG. 10 is a side plan view illustrating a further method of manufacture.
Figure 11:
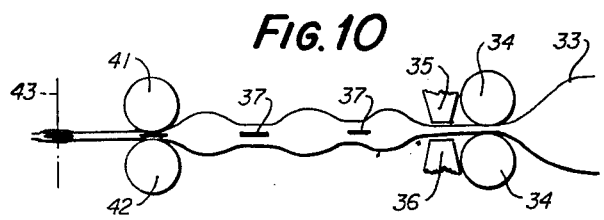
FIG. 11 is a top plan view of the showing in FIG. 10.

An automatic heat sealing manufacturing technique is illustrated schematically in FIGS. 10 and 11, where a flattened longitudinal strip of sheet stock 33 is shown as being folded upwardly upon itself in face-to-face relationship (along a line approximately at the center of the longitudinal strip) by suitable lateral guide rollers 34 as the flat sheet stock is indexed through apparatus. Then heat seal elements 35 and 36 move together to form a relatively wide permanent heat seal 37 at longitudinally spaced intervals along the folded stock. These permanent seals 37 extend transversely from and intersect the fold line so as to form a series of pockets along the longitudinal folded length of the sheet material. The distance out from the fold line to which these permanent seals extend is limited by the size relationships aforediscussed for the envelope cavity of the packages. The line of pockets, separated by seals 37, are then forced open by guide discs 38 and 39; and simultaneously the line of pockets is lowered in its travel as compared to the line of travel at seal elements 35 and 36. This action serves to bulge the sides of the pockets outwardly for reception of a measured quantity of the spreadable composition to be packaged. The measured quantity is dispensed in a shot manner by a plunger type extruder 40. Thereafter, the line of pockets is passed between heat sealing co-acting rolls 41 and 42, which add the narrow line of temporary or light heat seal 19 in a longitudinal direction across the top of the envelope cavity of the package. The line of temporary light heat seal connects terminal portions of the permanent seals opposite the fold line or edge. Cutter knives, not illustrated, are used to sever the envelope packages transversely through the permanent seals 37 along illustrated dash line 43. If desired, the cut along dash line 43 may be discontinuous, in the form of a line of dots or dash cuts, thereby maintaining the packages, for marketing purposes, in a continuous strip from which the consumer can easily sever a package at the time of use.

Temporary seals such as illustrated at numeral 19 in the various figures of the drawing are conveniently formed by employing relatively thin or narrow lines (e.g., 2 millimeters width) of heat seal as compared to the practice of employing relatively wider lines of heat seal (on the order of 4 or 5 millimeters or even 1 centimeter or more in width) for permanent heat seals. Since the fibrous character of heat sealable fibrous layers is largely destroyed by fusion in the heat seal area, the ease of rupture of temporary heat seals 19 is sometimes desirably improved by incorporating additional structure in that area. Without additional structure in that area, the rupture of temporary heat seals is sometimes accompanied by the formation of strings of tear or minute hairy projections along the joined surfaces of temporary seal. Also, additional structure is preferably employed where the base film consists of material which is thermoplastic at the temperature of heat sealing for the fibers (as distingushed from structures where the fibers are heat sealed at temperatures below the softening temperature for the base film or where the base film structure includes an essentially non-thermoplastic film).

Figure 12:
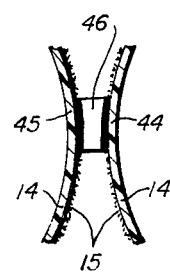
FIG. 12 is an enlarged fragment of a package illustrating a temporary heat seal structure.

In FIG. 12, which is an enlarged fragment of a package, a special temporary heat seal structure 19 is illustrated. In that structure, fibrous surface 15 of each sheet material 44 and 45 is joined to an intermediate striplike layer 46. Strip or layer 46 is thermoplastic and extends as a narrow strip down the length of the temporary seal 19. Illustratively, its structure may be such that it is of gradually varying composition from one surface to the other. The surface of strip 46 to which fibers 15 of one sheet 44 are bonded may be relatively high melthing, whereas the surface to which fibers 15 of the other sheet 45 is bonded may have an adhesive activation temperature comparable to the heat seal activation temperature of the fibers 15 of the sheet material. Thus, during the heat sealing of temporary seal 19 (which in this structural relationship may be accomplished in a relatively wide width up to the width of strip 46), the fibers of sheet 45 fuse into and permanently unite with the surface of strip 46 adjacent thereto; but the fibers of sheet 44 merely fuse together and into contact with the surface of strip 46 adjacent thereto, without merging or blending with the material of that surface. The interface between fused fibers of sheet 44 and the adjacent surface of strip 46 therefore is relatively easily ruptured, but is a hermetic seal prior to being ruptured. Illustratively, a suitable strip for a package formed of sheet material carrying thermoplastic cellulose acetate fibers is one having cellulose acetate as the material exposed on one side and a higher melting but possibly still a thermoplastic nylon as the material exposed on its opposite surface. A variety of resin combinations are possible, with the composition intermediate the surface portions being a blend or admixture. Manufacture of a strip 46 is easily accomplished by coating the lower softening or melting thermoplastic, (after elevating it to the softening temperature of the higher melting thermoplastic) as a hot melt upon a thin film of the higher melting thermoplastic. Instead of employing a separate strip 46, similar structural results are made possible by coating a strip-like layer of resin (having a higher softening temperature than the softening temperature of the thermoplastic fibers of the sheet stock) in a pattern such as illustrated for the temporary seal 19 in FIG. 9. One way of accomplishing this is by solvent coating.

If desired, the sheet material employed in forming the packets may itself be free of a recess-containing layer unified therewith and a separate recess-containing layer means bonded in position, as by heat sealing, at the time of forming the packets. (Also, even when the sheet material employed is one having fibers or the like unified as a layer thereto, additional recess-containing layer means may be incorporated in the packets.) This has been illustrated in connection with FIG. 5, where the recess-containing layer means is in the nature of a tongueflap of a recess-containing sheet formed either of heat sealable or non-heat sealable material. A non-woven (or even woven) mat of fibers or a porous spongy sheet material may be employed as a separate recess-containing sheet. Such a sheet may even be as thick as about 5 millimeters, but generally will be as thin as possible (e.g., 100 or 200 microns) consistant with the recess volume required. Thickness generally should not exceed 1 or 2 millimeters, and usually not even a half millimeter or 500 microns.

The separate recess-containing sheet may be handled as a continuous strip of material and feed with a base polymeric film through manufacturing steps such as discussed in connection with FIGS. 9, 10 and 11. Suitably, a relatively narrow band of a recess-containing separate sheet or layer material (e.g., of a width up to about threefourths or even the entire depth of the envelope cavity contemplated) may be inserted as an intermediate layer between the walls of a polymeric base film chosen for a string of packets (such as described in connection with FIGS. 10 and 11). If the recess-containing separate sheet is, for example, a heat sealable mat of thermoplastic cellulose acetate fibers, the formation of heat seals 37 between a string of packets, as illustrated in FIGS. 10 and 11, can also effectively fuse the fibers of the band or width of cellulose acetate in the area of heat seals 37. Other processing steps can be as discussed in connection with FIGS. 10 and 11. The result is that envelope packets are formed with a recess-containing layer extending between end seals (e.g., 17 and 18 as illustrated in FIG. 1), and united with those end seals, but not united continuously over the inner surfaces of either base polymeric film structure forming the walls of the packets. Upon inversion, as illustrated in FIGS. 2–4 inclusive, the band or width of recess-containing sheet material in such packets is exposed upon one or the other side of the inverted envelope pocket, ready for use in applying the packaged messy composition. In this type of structure, there need be no recess-containing material in the portion of the envelope package where the temporary seal 19 is formed. Also, the ear-flaps 20 and 21 may conveniently be free of a recess-containing coating. But if a recess-containing layer free of messy ingredients is desired for finish shining or the like after application of messy ingredients, it is conveniently made available by employing a band or width of separate recess-containing sheet material so wide as to extend through the temporary seal 19 and outwardly as an extra flap intermediate ear-flaps 20 and 21.

Illustrative messy spreadable compositions desirably packaged as taught herein are metal polishes (e.g., polishes containing, for example, finely-divided pigment size abrasivelike particles of precipitated chalk, plus a film-forming organic compound such as an alkyl thiol, and a volatile solvent, suitably organic in nature, for the film-forming organic compound). An illustrative shoe polish may comprise a wax emulsion (e.g., carnauba wax in water), a binder or strength-imparting tack-free film-forming organic material (e.g., a polymeric acrylic resin emulsion), leveler-type ingredients which reduce surface tension of an applied film (e.g., butoxyethyl phosphate, alcohols, etc.), pigment sized particles such as carbon black, and a diluent such as water. Cleansing compositions or spreadable character may include such ingredients as a detergent, a humectant, an astringent (e.g., particles of aluminum sulfate), and drying agent such as alcohol. Sterile or non-sterile composition may be packaged according to this teaching. Insect repellants, soaps, abrasive materials, even powdery compounds are but further illustrations of the almost limitless variety of compositions which may be packaged in the relatively flat-type envelopes using the principles hereof.

Generally, the quantity of composition in each envelope will not exceed about 2 or possibly 3 cubic centimeters in volume; although a volume as high as 5 (or even possibly 10) cubic centimeters may be so packaged. Sometimes a volume as low as 0.001 cubic centimeter is all that may be needed (as, for example, in packaging a sample for a potential user to test to determine suitability in a particular application before purchasing bulk quantities).

As an alternate to printing identifying indicia or instructions upon sheet material or an envelope of the invention, or in addition to so doing, a label flap or sheet carrying such data may be attached to an envelope, preferably to a sealed area of the sheet material or to an ear-flap. Where the package is to be hung on a hook for display purposes, a small hole may be punched through a relatively wide seal area or through an ear-flap.

That which is claimed is:

1. As a new article of manufacture: A unitary sheet material of such flexible character as to permit a pocket formed of said sheet material to be turned inside out by hand, said sheet material comprising a thin self-supporting non-fibrous non-absorbent non-porous tough tear-resistant substantially-fluid-impervious substantially non-thermoplastic flexible organic polymeric film comprising polyethylene terephthalate exposed on one side thereof, and a flexible porous non-woven recess-containing layer consisting essentially of randomly oriented non-woven thermoplastic fibers exposed on the other side thereof, said recess-containing layer being capable of holding a messy composition in recesses thereof, said non-thermoplastic polymeric film side of said unitary sheet material being non-heat sealable to itself, and the recess-containing layer side of said unitary sheet material having the property of being heat sealable to itself.

* * * * *